US006833402B2

(12) United States Patent
 Ouchi

(10) Patent No.: US 6,833,402 B2
(45) Date of Patent: Dec. 21, 2004

(54) FLAME-RETARDANT POLYAMIDE COMPOSITION, AND ITS USE

(75) Inventor: Kunihiro Ouchi, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 442 days.

(21) Appl. No.: 09/922,855

(22) Filed: Aug. 7, 2001

(65) Prior Publication Data

US 2002/0040089 A1 Apr. 4, 2002

(30) Foreign Application Priority Data

Aug. 9, 2000 (JP) ....................................... 2000-241401

(51) Int. Cl.$^7$ ................................................. C08K 3/10
(52) U.S. Cl. ...................................... 524/409; 524/464
(58) Field of Search ................................. 524/408, 464

(56) References Cited

FOREIGN PATENT DOCUMENTS

| EP | 0410301 A1 * | 1/1991 |
| JP | 51-47034 | 4/1976 |
| JP | 56-2100 | 1/1981 |
| JP | 59-53536 | 3/1984 |
| JP | 3-66755 | 3/1991 |
| JP | 5-320503 | 12/1993 |
| WO | WO 98/14510 | 4/1998 |

* cited by examiner

Primary Examiner—Edward J. Cain

(74) Attorney, Agent, or Firm—Birch, Stewart, Kolasch & Birch, LLP

(57) ABSTRACT

The flame-retardant polyamide composition of the present invention comprises (A) 20 to 80% by weight of an aromatic polyamide, composed of recurring units of dicarboxylic acid component unit and diamine component unit, the former composed of 30 to 100% by mol of a terephthalic acid component unit and 0 to 70% by mol of an aromatic dicarboxylic acid component unit other than terephthalic acid and/or 0 to 70% by mol of a $C_4$–$C_{20}$ aliphatic dicarboxylic acid component unit and the latter composed of an aliphatic diamine component unit and/or an alicyclic diamine component unit; and having an MFR of 40 to 300 g/10 minutes, determined at a load of 2,160 g and temperature of 10° C. plus melting point, and melting point exceeding 290° C.; (B) 5 to 50% by weight of an inorganic reinforcing agent, (C) 5 to 40% by weight of a bromine-based flame retardant, containing at least one type of polybrominated styrene obtained by polymerization of brominated styrene, and (D) 0.1 to 10% by weight of an antimony-containing compound and/or zinc-containing compound oxide, wherein the polyamide composition has flame retardancy equivalent to V-0 determined in accordance with the UL-94 specification, and the bromine-based flame retardant has a number-average particle size of less than 0.90 μm in the polyamide composition, when it is pelletized.

The present invention can give an electric or electronic device member excellent in toughness and resistance to heat.

9 Claims, 1 Drawing Sheet

FLAME-RETARDANT POLYAMIDE COMPOSITION, AND ITS USE

FIELD OF THE INVENTION

The present invention relates to a flame-retardant polyamide composition excellent in mechanical properties, e.g., flowability and toughness, and in resistance to reflow heat, and also to electric and electronic device members, e.g., connectors, made of the flame-retardant polyamide composition, more particularly to a flame-retardant polyamide composition suitable for forming electric and electronic device members, e.g., fine-pitch connectors which are thin and short in distance between the connector terminals, and to heat-resistant electric and electronic device members, e.g. connectors, made of the flame-retardant polyamide composition.

BACKGROUND OF THE INVENTION

The dip method is a normal choice for soldering connectors onto a print-circuit board. Recently, reflow (surface mounting) soldering has been developed as the method for high-density mounting. It coats a print-circuit board with a creamy solder by the printing techniques, puts the device members (e.g., connector) thereon, and heats and melts the solder by infrared ray and/or hot air, to mount these members by the molten solder (surface mounting). The connector material must be highly resistant to heat, when surface-mounted by the reflow soldering, because it is exposed to a high temperature of 230 to 240° C. by infrared ray or hot air in the reflow furnace.

Polyamide has been used as the material for molding electronic device members, because of its moldability into a desired shape after being molten under heating. In general, the polyamides widely used for the above purposes include nylon 6 and nylon 66. These aliphatic polyamides, however, are not sufficiently resistant to heat as the materials for the surface-mounted members, which are exposed to high temperature, although having good moldability. The surface mounting, therefore, needs highly heat-resistant polyamides, which has led to development of nylon 46. It is more resistant to heat than nylon 6 and nylon 66, but has a disadvantage of high water absorptivity, which may cause problems. The electric or electronic device member of nylon 46 resin composition, when it absorbs water, may undergo dimensional changes caused by the moisture, and blister under heating during the reflow step. In order to solve these problems, an aromatic polyamide has been developed, as disclosed by Japanese Patent Laid-Open Publication No.53536/1984. It is derived from an aromatic dicarboxylic acid, e.g., terephthalic acid, and an aliphatic alkylene diamine, and is higher in resistance to heat, mechanical strength and rigidity and lower in water absorptivity than nylon 66 and nylon 46.

A polyamide resin is inherently self-extinguishing in nature, but must be incorporated with a flame retardant for surface-mounted members required to clear the high flame retardancy standard, e.g., V-0 specified by UL94. One of the common methods to improve flame retardancy of polyamide is incorporation of a flame retardant, e.g., a halogen compound. For example, a composition of polyamide is incorporated with a halogenated polystyrene (Japanese Patent Laid-Open Publication No. 47034/1976), with a brominated polystyrene represented by Ferro's Pyrocheck 68PB, (Japanese Patent Laid-Open Publication No. 66755/1991), with a polybrominated styrene, which is produced by Polymerization of brominated styrene and is more thermally stable than brominated polystyrene (Japanese Patent Laid-Open Publication No. 320503/1993, WO 98/14510), and with a condensate of brominated phenol (Japanese Patent Laid-Open Publication No2100/1981). These halogen-based flame retardants do provide flame retardancy and improve flowability characteristics, but tend to deteriorate mechanical properties, e.g., toughness.

Recently, surface-mounted members, e.g., connectors, are becoming thinner and shorter in pitch. As such, the resin for these members are required not only to be higher in resistance to heat and flowability but also in toughness, in order to prevent cracking of the formed member, e.g., connector, when a metallic terminal is pushed thereinto.

Therefore, a flame-retardant polyamide composition excellent in flame retardancy, flowability and toughness has been increasingly in demand for these surface-mounted embers, e.g., connectors.

Some of the methods to improve mechanical properties of polyamide, e.g., toughness, include incorporation of a maleic polyolefin or SEBS. However, mere addition of the above compound will deteriorate flowability of polyamide.

It is considered that dispersion of the flame retardant particles uniformly and finely will control property deterioration caused by the retardant. However, no method has been investigated to reduce retardant particle size in a base resin dispersed with the retardant and glass fibers, or to measure the retardant particle size. No attempt has been made to establish the relationship between flame retardant particle size and toughness of a resin composition.

Japanese Patent Laid-Open Publication No.320503/1993 discloses number- and weight-average molecular weights of polybrominated styrene, discussing that mechanical properties deteriorate as they decrease and flowability decreases as they increase, and that a flame retardant preferably has an average diameter of 20 $\mu$m or less, more preferably 10 $\square$m or less, when it is dispersed in a polyamide resin composition. However, it is silent whether or not size of the flame retardant dispersed in the polyamide resin composition is concretely measured. The inventors of the present invention have, measured the particle size to find that it is very large. The specification is also silent about the concrete method for finely dispersing the particles and concrete discussion on the relationship between the particle size and composition properties.

OBJECT OF THE INVENTION

The invention has been developed to solve the problems involved in the conventional techniques. It is an object of the invention to provide a polyamide composition excellent in flame retardancy, good in flowability and high in toughness.

It is another object of the invention to provide electric and electronic device members made of the flame-retardant polyamide composition.

SUMMARY OF THE INVENTION

The flame-retardant polyamide composition of the present invention comprises:

(A) 20 to 80% by weight of an aromatic polyamide, composed of recurring units of dicarboxylic acid component unit and diamine component unit, the former composed of 30 to 100% by mol of a terephthalic acid component unit and 0 to 70% by mol of an aromatic dicarboxylic acid component unit other than terephthalic acid and/or 0 to 70% by mol of a $C_4$–$C_{20}$ aliphatic dicarboxylic acid component unit and the latter composed of an aliphatic diamine component unit and/or an alicyclic diamine component unit; and having an MFR of 40 to 300 g/10 minutes, determined at a load of 2,160 g and temperature of 10° C. plus melting point, and melting point exceeding 290° C.;

(B) 5 to 50% by weight of an inorganic reinforcing agent, (C) 5 to 40% by weight of a bromine-based flame retardant, containing at least one type of polybrominated styrene obtained by polymerization of brominated styrene, and (D) 0.1 to 10% by weight of an antimony-containing compound and/or zinc-containing compound oxide, the components (A) to (D) totaling 100% by weight, wherein, the polyamide composition has flame retardancy equivalent to V-0 determined in accordance with the UL-94 specification, and the bromine-based flame retardant has a number-average particle size of less than 0.90 μm in the polyamide composition, when it is pelletized.

The flame-retardant pelletized polyamide resin composition of the present invention comprises:

(A) 20 to 80% by weight of an aromatic polyamide, composed of recurring units of dicarboxylic acid component unit and diamine component unit, the former composed of 30 to 100% by mol of a terephthalic acid component unit and 0 to 70% by mol of a $C_4$–$C_{20}$ an aromatic dicarboxylic acid component unit other than terephthalic acid and/or aliphatic dicarboxylic acid component unit and the latter composed of an aliphatic diamine component unit and/or an alicyclic diamine component unit; and having an MFR of 40 to 300 g/10 minutes, determined at a load of 2,160 g and at a temperature of 10° C. plus melting point, and melting point exceeding 290° C.;

(B) 5 to 50% by weight of an inorganic reinforcing agent, (C) 5 to 40% by weight of a bromine-based flame retardant, containing a least one type of polybrominated styrene obtained by polymerization of brominated styrene, and (D) 0.1 to 10% by weight of an antimony-containing compound and/or zinc containing compound oxide, the components (A) to (D) totaling 10% by weight, wherein, the polyamide extracted with concentrated sulfuric acid from the pelletized polyamide resin composition has a viscosity of 60 to 110 ml/g.

The formed article of flame-retardant polyamide composition of the present invention comprises:

(A) 20 to 80% by weight of an aromatic polyamide, composed of recurring units of dicarboxylic acid component unit and diamine component unit, the former composed of 30 to 100% by mol of a terephthalic acid component unit and 0 to 70% by mol of an aromatic dicarboxylic acid component unit other than terephthalic acid and/or 0 to 70% by mol of a $C_4$–$C_{20}$ aliphatic dicarboxylic acid component unit and the latter composed of an aliphatic diamine component unit and/or an alicyclic diamine component unit;

(B) 5 to 50% by weight of an inorganic reinforcing agent, (C) 5 to 40% by weight of a bromine-based flame retardant, containing at least one type of polybrominated styrene obtained by polymerization of brominated styrene, and (D) 0.1 to 10% by weight of an antimony-containing compound and/or zinc containing compound oxide, the components (A) to (D) totaling 10% by weight, wherein, the bromine-based flame retardant has a number-average particle size of less than 0.90 μm.

The polyamide extracted with concentrated sulfuric acid from the above formed article preferably has a viscosity of 60 to 110 ml/g, and the formed article normally has flame retardancy equivalent to V-0 determined in accordance with the UL-94 specification.

The electric or electronic device member of the present invention is made of the flame-retardant polyamide composition or pelletized polyamide resin composition of the present invention, formed into a desired shape The inventors of the present invention have found that a combination of specific aromatic polyamide and a specific flame retardant can uniformly reduce size of the flame retardant particles, and give the flame-retardant polyamide composition of high flowability and toughness. The flame-retardant polyamide composition can give finely pitched electric or electronic device members recently in demand, and reduce risk of thermally damaging these members even when they are exposed to high temperature, e.g., during the reflow soldering step.

DETAILED DESCRIPTION OF THE INVENTION

Figure 1:
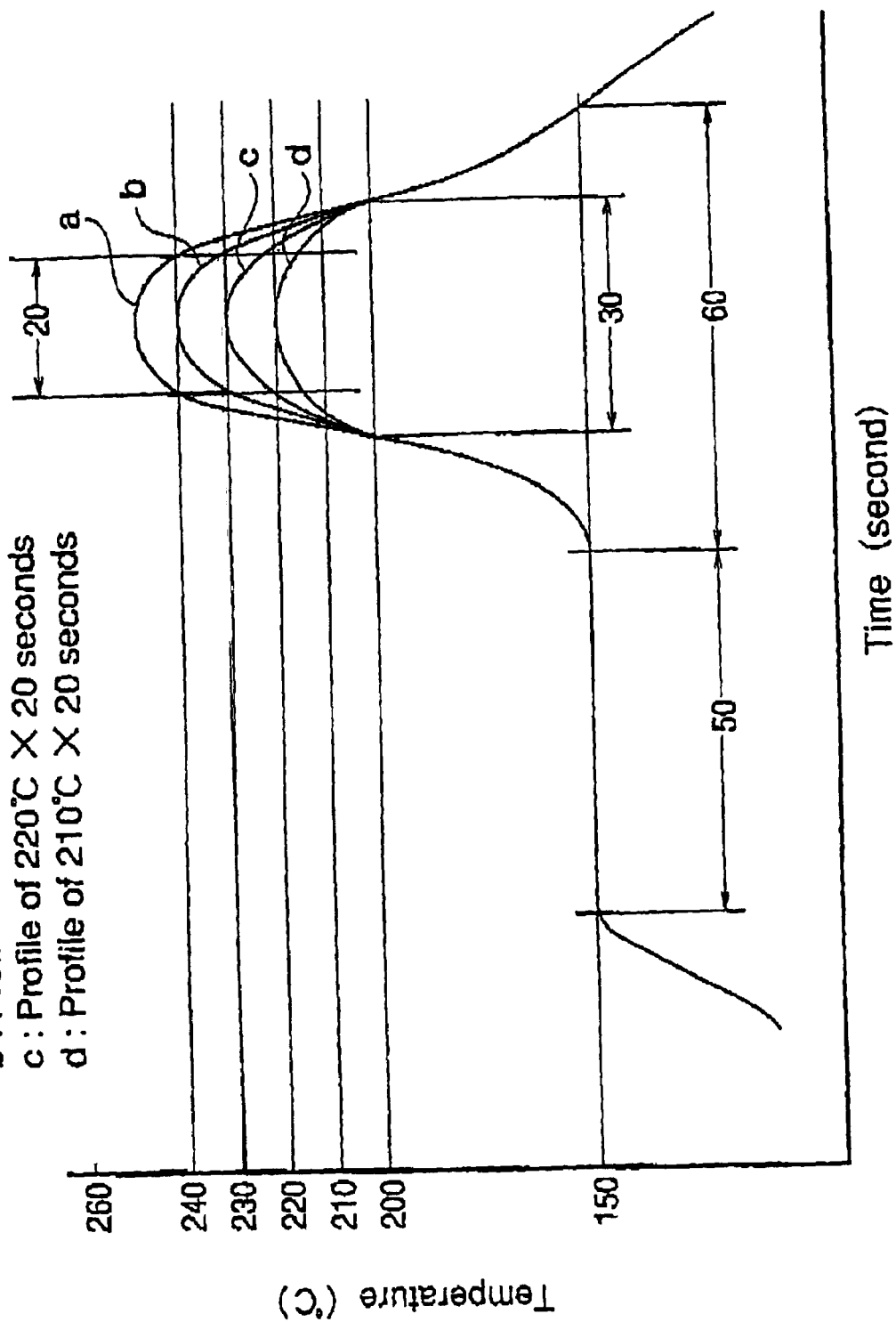
FIG. 1 illustrates the reflow process.
Temperature (° C.), Time (seconds)
"a": Temperature profile of 240° C.×20 seconds

Next, the flame-retardant polyamide composition of the present invention and electric and electronic devices, in particular connectors, made of the above composition are concretely described.

The flame-retardant polyamide composition of the present invention comprises:

(A) 20 to 80% by weight of an aromatic polyamide, composed of recurring units of dicarboxylic acid component unit and diamine component unit, the former composed of 30 to 100% by mol of a terephthalic acid component unit and 0 to 70% by mol of an aromatic dicarboxylic acid component unit other than terephthalic acid and/or 0 to 70% by mol of a $C_4$–$C_{20}$ aliphatic dicarboxylic acid component unit and the latter composed of an aliphatic diamine component unit and/or an alicyclic diamine component unit; and having an MFR of 40 to 300 g/10 minutes, determined at a load of 2,160 g and at a temperature of 10° C. plus melting point, and melting point exceeding 290° C.;

(B) 5 to 50% by weight of an inorganic reinforcing agent, (C) 5 to 40% by weight of a bromine-based flame retardant, containing at least one type of polybrominated styrene obtained by polymerization of brominated styrene, and (D) 0.1 to 10% by weight of an antimony-containing compound and/or zinc containing compound oxide, the components (A) to (D) totaling 100% by weight, wherein, the polyamide composition has flame retardancy equivalent to V-0 determined in accordance with the UL-94 specification and the bromine-based flame retardant has a number-average particle size of less than 0.90 μm in the polyamide composition, when it is pelletized.

It is considered that the relationship between MFR of the aromatic polyamide and that of the polybrominated styrene as the major ingredient for the bromine-based flame retardant is essential for the flame retardant particles to be dispersed in the aromatic polyamide in such a way to have a number-average particle size of less than 0.90 μm.

(A) Heat-Resistant Polyamide

An aromatic polyamide is used as the heat-resistant polyamide for the present invention.

The above-described aromatic polyamide (A) is composed of the recurring units derived from (i) carboxylic acid and (ii) diamine.

The recurring units which constitute the aromatic polyamide has (i) 30 to 100% by mol, preferably 50 to 100% by mol, of the dicarboxylic acid component unit derived from terephthalic acid. In addition to the telephthalic acid component units, the recurring units which constitute the aromatic polyamide can contain 0 to 70% by mol. preferably 0 to 50% by mol, of an aromatic dicarboxylic acid component unit other than terephthalic acid and/or 0 to 70% by mol, preferably 0 to 50% by mol, of aliphatic dicarboxylic acid component unit 4 to 20, preferably 6 to 12, carbon atoms. They also serve as the dicarboxylic acid component (i).

The diamine component unit (ii) which constitutes, together with the dicarboxylic acid component unit (i), the aromatic polyamide is composed of an alkylene diamine component unit of a straight-chain alkyl diamine having 4 to 18, preferably 6 to 12, carbon atoms and/or that having an alkyl group in the side chain and 4 to 18, preferably 6 to 12, carbon atoms.

The examples of the recurring units composed of the terephthalic acid and aliphatic diamine component units include those represented by the general formula [I]:

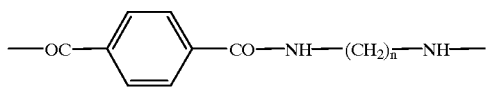

[I]

wherein, "n" is 4 to 18, preferably 6 to 12.

The examples of the recurring units which can suitably constitute the polyamide used in the present invention, together with the one represented by the general formula [I], include those represented by the general formula [II]:

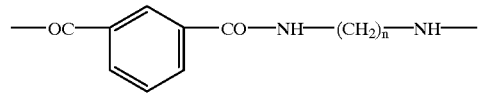

[II]

wherein, "n" is 4 to 18 preferably 6 to 12, independent of that for the general formula [I].

The other examples of the recurring units which can suitably constitute the polyamide used in the present invention, together with the one represented by the general formula [I], include those represented by the general formula [III]:

—OC—R$^1$—CO—NH—R$^2$—NH—    [III]

wherein, R$^1$ and R$^2$ are each a cyclic group represented by the following general formula, or a divalent hydrocarbon group of 4 to 18, preferably 6 to 12, carbon atoms. It is preferable that at least one of R$^1$ and R$^2$, preferably the component unit derived from dicarboxylic acid, is a group having the following cyclic structure. For the recurring unit represented by the general formula [III], each of R$^1$ and R$^2$ may be a group of the following cyclic structure However, the dicarboxylic acid component unit normally may have the cyclic structure and the other diamine component unit normally may be a divalent hydrocarbon group of 4 to 18, preferably 6 to 12, carbon atoms. In this case, the divalent hydrocarbon group of 4 to 18, preferably 6 to 12, carbon atoms as the diamine component unit may be a diamine of alicyclic structure, e.g., cyclohexane diamine. Each component unit may be a divalent hydrocarbon group of 4 to 18, preferably 6 to 12, carbon atoms.

The hydrogen atom bonded to the carbon atom which constitutes the cyclic structure of the divalent group of cyclic structure shown below may be substituted, at least partly, with an alkyl group, e.g., methyl or ethyl, or another monovalent group, or monovalent atom, e.g., a halogen atom.

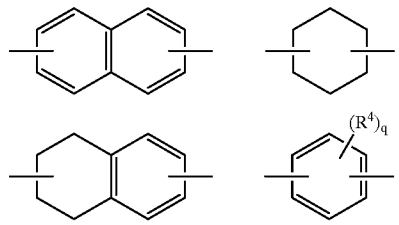

wherein, R$^4$ is a hydrogen atom or an alkyl group of 1 to 5 carbon atoms; and "q" is an integer of 1 to 4.

The aromatic polyamide is incorporated normally at 20 to 80% by weight, preferably 25 to 70% by weight.

The dicarboxylic acid (i) which constitutes the aromatic polyamide for the present invention contains an aromatic dicarboxylic acid as the essential ingredient, and the aromatic dicarboxylic acid preferably contains terephthalic acid (i-a).

The dicarboxylic acid (i) may contain an aromatic dicarboxylic acid other than terephthalic acid (i-b), or aliphatic dicarboxylic acid (i-c)

The examples of the aromatic dicarboxylic acid other than terephthalic acid (i-b) include isophthalic acid, 2-methyl terephthalic acid, naphthalene dicarboxylic acid, and a combination thereof.

The concrete examples of the aliphatic dicarboxylic acid (i-c) include an aliphatic dicarboxylic acids having an alkylene group of 4 to 20, preferably 6 to 12, carbon atoms, e.g. succinic acid, adipic acid, azelaic acid, sebacic acid, and a combination thereof, of which adipic acid is more preferable.

The diamine (ii) which constitutes, together with the dicarboxylic acid (i), the aromatic polyamide is a straight-chain alkylene diamine having 4 to 18, preferably 6 to 12, carbon atoms and/or alkylene diamine or alicyclic diamine having an alkylene group in the side chain and 4 to 18, preferably 6 to 12, carbon atoms, The concrete examples of the straight-chain alkylene diamine having 4 to 18 carbon atoms as the diamine (ii) include 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 2-methyl-1,5-diaminopentane, 2-methyl-1,8-diaminooctane, and a combination thereof.

Of these compounds, 1,6-diaminohexane, 1,9-diaminononane and 1,10-diaminodecane are more preferable, and 1,6-diaminohexane is still more preferable.

The examples of alicyclic diamine include cyclohexanediamine.

The aromatic polyamide for the present invention has the above-described recurring units derived from dicarboxylic acid containing terephthalic acid, and diamine. The terephthalic acid component unit accounts for 30 to 10% by mol, preferably 50 to 100% by mol, of the dicarboxylic acid component unit that constitutes the aromatic polyamide. The aromatic polyamide for the present invention also has the recurring units derived from an aromatic dicarboxylic acid other than terephthalic acid, and diamine, as described above, and the dicarboxylic acid component unit other than terephthalic acid accounts for 0 to 70% by mol, preferably 0 to 50% by mol, of the dicarboxylic acid component unit that constitutes the aromatic polyamide.

The aromatic polyamide for the present invention has the recurring units derived an aliphatic dicarboxylic acid and diamine, wherein the aliphatic dicarboxylic acid component unit accounts for 0 to 70% by nol, preferably 0 to 50% by mol, of the dicarboxylic acid component unit that constitutes the aromatic polyamide.

Preferably, the component unit (a) derived from terephthalic acid is present at 30 to 100% by mol, preferably 40 to 80% by mol, still more preferably 50 to 70% by mol; the component unit (b) derived from an aromatic dicarboxylic acid other than terephthalic acid at 0 to 50% by mol, preferably 0 to 40% by mol, still more preferably 0 to 20% by mol; and the component unit (c) derived from an aliphatic dicarboxylic acid at 0 to 70% by mol, preferably 10 to 60% by mol, still more preferably 20 to 50% by mol, all percentages based on the component unit derived from the dicarboxylic acids.

The aromatic polyamide for the present invention must has an MFR of 40 to 300 g/10 minutes, determined at a load of 2,160 g and at a temperature of 10° C. plus melting point, preferably 50 to 250 g/10 minutes, more preferably 60 to 200 g/10 minutes.

The flame-retardant polyamide composition of the present invention can have very high flowability, resistance to heat and mechanical properties by combining the aromatic polyamide having an $MFR_{mp+10}$ of 40 g/10 minutes or more, determined at 10° C. plus melting point, preferably 50 to 250 g/10 minutes, with the polybominated styrene of specific melt viscosity, which is the main ingredient for the bromine-based flame retardant described later, having an $MFR_{270° C.}$ of 40 g/10 minutes or more, determined a 270° C., preferably 50 to 350 g/10 minutes.

As described above, the aromatic polyamide has a high melting point, normally exceeding 290° C. Of the high-melting aromatic polyamides, those having a melting point of 295 to 330° C., preferably 300 to 320° C., show especially high resistance to heat. The amorphous part of the aromatic polyamide generally has a glass transition temperature of 80° C. or higher.

The aromatic polyamide, having the specific structure above-described, shows a low water absorptivity.

The aromatic polyamide (A) for the present invention is highly resistant to heat, processing temperature therefore during the compounding or molding step being normally 280 to 380° C., preferably 300 to 850° C.

The above-described aromatic polyamide for the flame-retardant polyamide composition of the present invention may be an individual aromatic polyamide having a composition, MFR and melting point each in the above range, or composed of two or more types of aromatic polyamides of different properties. In the latter case, types and proportions of these polyamides are adjusted to have each required property in the above range as a whole.

The aromatic polyamide for the flame-retardant polyamide composition of the present invention preferably as a viscosity of 60 to 110 ml/g, more preferably 70 to 105 ml/g, determined in accordance with ISO 307-1984(E), after it is extracted from the flame-retardant polyamide composition having been adjusted with the components described below.

Viscosity of the polyamide for the present invention is determined in accordance with ISO 307-1984(E). More concretely, the polyamide is extracted with concentrated sulfuric acid (96%) from the flame-retardant polyamide composition of the present invention, to prepare the solution of the concentrate sulfuric acid containing polyamide at 0.005 g/ml. Viscosity of the polyamide means that of the above solution determined at 25° C. by an Ubbelode type viscometer specified by ISO 3105.

The flame-retardant polyamide composition of the present invention contains the aromatic polyamide at 20 to 80% by weight, preferably 25 to 70% by weight.

(B) Inorganic Reinforcing Agent

The flame-retardant polyamide composition of the present invention contains an inorganic reinforcing agent in the above-described aromatic polyamide.

The inorganic reinforcing agents useful for the present invention include various types of inorganic fillers in the form of fiber, powder, particle, plate, needle, cloth, mat, and the like.

More concretely, the inorganic reinforcing agents useful for the present invention include inorganic fibers such as glass, potassium titanate, metal-coated glass, ceramic, wollastonite, carbon, metal carbide, hardened metal, asbestos and boron fibers. Of these fibrous fillers, glass fibers are particularly preferable. The composition, when reinforced with glass fibers, will have improved moldability, and provide the formed article of the thermoplastic resin with improved mechanical properties (e.g., tensile strength, bending strength and bending modulus of elasticity) and heat resistance characteristics (e.g., thermal deformation temperature).

The glass fibers have an average length of normally 0.1 to 20 mm, preferably 0.3 to 6 mm, and aspect ratio of normally 10 to 2000, preferably 30 to 600. It is preferable to use the glass fibers having an average length and aspect ratio each in the above range. These glass fibers are incorporated in the composition normally at 5 to 50% by weight, preferably 10 to 40% by weight.

The inorganic reinforcing agents useful for the present invention include, in addition to the above fibrous agents, those in the form of powder, particle, plate, needle, cloth and mat. More concretely, these agents include inorganic compounds, e.g., silica, silica-alumina, alumina, calcium carbonate, titanium dioxide, talc, wollastonite, diatomaceous earth, clay, kaolin, spherical glass, mica, sum, red ion oxide, magnesium oxide and zinc oxide in the form of powder or plate; and potassium titanate in the form of plate.

These inorganic reinforcing agents may be used either individually or in combination. They may be also treated with silane or titanium coupling agent. For example, they may be surface-treated with a silane-based compound, e.g., vinyl triethoxysilane, 2-aminopropyltriethoxysilane, 2-glycidoxypropyltriethoxysilane. When these agents are in the form of particle, their average particle size is normally in the range of 0.1 to 200 μm, preferably 1 to 100 μm.

Of these inorganic reinforcing agents, glass fibers are more preferable for the present invention.

The inorganic reinforcing agent is incorporated in the composition normally at 5 to 50% by weight, preferably 10 to 45% by weight.

(C) Bromine-Based Flame Retardant

The examples of the bromine-based flame retardant useful for the present invention include brominated polystyrene, polybrominated styrene and brominated polyphenylene ether. More concretely, these brominated polystyrene compounds include polydibromostyrene, polytribromostyrene, polypentabromostyrene and polytribromo-α-methyl styrene.

These brominated polystyrene compounds can be obtained by brominating polystyrene or poly-α-methyl styrene, and polybrominated styrene, on the other hand, can be obtained by polymerization of brominated styrene or brominated a methyl styrene.

It is particularly preferable for the present invention to use polybrominated styrene prepared by polymerization of styrene or α-methyl styrene brominated beforehand as the monomer. Styrene or α-methyl styrene as the stock monomer is brominated at least partly at the hydrogen atom that constitutes the aromatic ring, and polymerized into the polybrominated styrene, wherein the bromine atom is present in the polymer as the hydrogen atom bonded to the carbon atom that constitutes the aromatic ring is partly substituted by the bromine, the hydrogen atom forming the alkyl chain which forms the main skeleton of the polymer being essentially not substituted with bromine.

On the other hand, in the brominated polystyrene produced by brominating polystyrene or poly α-methyl styrene after polymerization of styrene or α-methyl styrene, bromine is present mainly in the aromatic ring as the hydrogen atom bonded to the carbon atom that constitutes the aromatic ring is partly a substituted by the bromine, but also present to some extent in the alkyl chain which forms the main skeleton of the polymer as the hydrogen atom in the alkyl chain is partly substituted with bromine. It differs from the polybrominated styrene in that the hydrogen atom in the alkyl chain which forms the main skeleton of the polymer is substituted with bromine.

However, both are represented by the general formula [IV]:

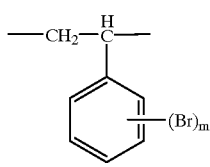

[IV]

wherein, "m" is an integer of 1 to 5.

The brominated polystyrene is obtained by polymerization of styrene, represented by the general formula [V], and then brominating the resultant polymer.

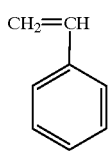

[V]

On the other hand, the polybrominated styrene is obtained by polymerization of brominated styrene, represented by the general formula

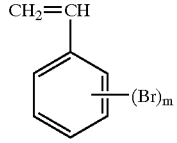

[VI]

The bromine-based flame retardant for the present invention preferably contains the polybrominated styrene, which is produced by polymerizing the monomer brominated beforehand.

The polybrominated styrene for the present invention has an MFR of 40 to 400 g/10 minutes, preferably 60 to 350 g/10 minutes, still more preferably 60 to 300 g/10 minutes, determined at a load of 1,200 g and at a temperature of 270° C., using an orifice having an internal diameter of 2.095 mm, or has a weight-average molecular weight (Mw) of 2,000 to 500,000, preferably 5,000 to 400,000, still more preferably 10,000 to 300,000.

The bromine-based flame retardant (C) for the present invention may contain a bromine compound selected from the following compounds, in addition to the above-described polybrominated styrene:

hexabromobenzene, pentabromoethylbenzene, hexabromobiphenyl, decabromodiphenyl, hexabromodiphenyl oxide, octabromodiphenyl oxide, decabromodiphenyl oxide, tetrabromobisphenol A and its derivatives, e.g., tetrabromobisphenol A-bis hydroxyethyl ether), tetrabromobisphenol A-bis(2,3-dibrormopropyl ether), tetrabromobisphenol A-bis(bromoethyl ether) and tetrabromobisphenol A-bis (allyl ether), tetrabromobisphenol S and its derivatives, e.g., tetrabrornobisphenol S-bis(hydroxyethyl ether) and tetrabromobisphenol S-bis(2,3-dibromopropyl ether), tetrabromophthalic acid anhydride and its derivatives, e.g., tetrabromophthalimide and ethylenebistetrabromophthalimide, ethylenebis(5,6-dibromonorbornane-2,3-dicarboxyimide), tris-(2,3-dibromopropl-1)-isocyanurate, Diels-Alder adduct of hexabromocyclopentadiene, tribromophenyl glycidyl ether, tribromophenyl acrylate, ethylenebistribromophenyl ether, ethylenebispentabromophenyl, ethylenebispentabromophenyl ether, tetradecabromodiphenoxybenzene, brominated polyphenylene oxide, brominated epoxy resin, brominated polycarbonate, polypentabromobenzyl acrylate, octabromonaphthalene, pentabromocyclohexane, hexabromocyclododecane, bis(tribromophenyl)fumaramide, and N-methylhexabromodiphenyl amine.

The bromine-based flame retardant is incorporated in the flame-retardant polyamide composition at 5 to 40% by weight, preferably 10 to 85% by weight.

(D) Antimony-Containing Compound and/or Zinc-Containing Compound Oxide

The examples of the antimony-containing compound as the component (D) for the present invention include antimony trioxide, antimony pentaoxide, antimony tetraoxide and sodium antimonate.

The examples of the zinc-containing compound oxide also as the component (D) for the present invention include zinc borates represented by the formulae:

$2ZnO.3B_2O_3$, $4ZnO.B_2O_3.H_2O$ and $2ZnO.3B_2O_5.3.5H_2O$, zinc stannates represented by the formulae $ZnSnO_3$ and $ZnSn(OH)_6$, zinc calcium molybdate, basic zinc molybdate, a compound of high-efficiency zinc molybdate and magnesium silicate, and zinc phosphate.

These antimony-containing compounds may be used either individually or in combination, and so may be the zinc-containing compound oxides. The antimony-containing compound may be also used together with the zinc-containing compound oxide. Of those above-described, preferable are sodium antimonate, $2ZnO.3B_2O_3$, and its combination.

The antimony-containing compound and/or zinc-containing compound oxide as the component (D) for the present invention are/is incorporated normally at 0.1 to 10% by weight, preferably 1 to 8% by weight. Flame retardancy of the composition of the present invention will be further enhanced when the component (D) is used in combination with the bromine-based flame retardant.

Other Components

The flame-retardant polyamide composition of the present invention may be incorporated, in addition to the above essential components, with one or more additives within limits not harmful to the object of the present invention. These additives include heat stabilizer, weathering stabilizer, plasticizer, thickening agent, antistatic agent, releasing agent, pigment, dye, inorganic or organic filler, nucleating agent, fibrous reinforcing agent, and compounding agent of inorganic compound (e.g., carbon black, talc, clay or mica).

In particular, the flame-retardant polyamide composition of the present invention will have further improved properties, e.g., heat resistance, flame retardancy, rigidity, tensile strength, bending strength and impact resistance, when incorporated with a fibrous reinforcing agent.

The flame-retardant polyamide composition of the present invention may be also incorporated with another type of polymer within limits not harmful to the object of the present invention. These polymers useful for the present invention include polyolefins, e.g., polyethylene, polypropylene, poly-4-methyl-1-pentene, ethylene/1-butene copolymer, propylene/ethylene copolymer, propylene/1-butene copolymer and polyolefin elastomer; and polystyrene, polyamide, polycarbonate, polyacetal, polysulfone, polyphenylene oxide, fluororesin and silicone resin.

The flame-retardant polyamide composition of the present invention contains the above described components (A) to (D) and, as required, one or more other components, and has flame retardancy equivalent to V-0, determined in accordance with the method specified by UL94.

The flame retardancy is measured by the following procedure, in accordance with the method specified by UL94.

The test piece is clamped upright at the upper end on the tester. The test piece is then exposed to a specified flame at the lower end for 10 seconds, and the flame is kept away from the test piece, to measure combustion time for the first run.

The second run is conducted in the same manner as the above, immediately after the combustion is terminated (or fire is extinguished).

These runs are repeated 10 times, where the longest combustion time (M) and total combustion time (T) are recorded.

Flame retardancy equivalent to V-0: M is 10 seconds or less, T is 50 seconds or less, the test piece is not combusted up to the clamp, and the cotton set underneath the test piece is not ignited by the molten test piece falling thereon.

Flame retardancy equivalent to V-1: M is 30 seconds or less, T is 250 seconds or less, the test piece is not combusted up to the clamp, and the cotton set underneath the test piece is not ignited by the molten test piece falling thereon.

Flame retardancy equivalent to V-2: M is 30 seconds or less, T is 250 seconds or less, the test piece is not combusted up to the clamp, and the cotton set underneath the test piece is ignited by the molten test piece falling thereon.

In the flame-retardant polyamide composition of the present invention, the bromine-based flame retardant particles have an average size of less than 0.9 $\mu$m, preferably 0.01 to 0.8 $\mu$m, and are dispersed in the pellets uniformly without agglomerating with each other. The average size of the bromine-based flame retardant dispersed in the pellets is determined by the following procedure.

First, each of the pellets of the flame-retardant polyamide composition of the present invention is covered with an epoxy resin. The pellet is ground to form the plane in which the glass fibers are arranged along the plane. The ground pellet is etched, at room temperature, with methylene chloride in which it is immersed for 2 hours, to elute the bromine-based flame retardant out of the plane.

Then, a Pt—Pd film is deposited over the plane by an ion sputterer (Hitachi Ltd., E-1030), and the plane left by the bromine-based flame retardant is observed by a scanning electron microscope (Hitachi Ltd., S-800, magnification: 500 and 3,000). The electron micrograms taken before and after the etching are compared with each other to determine the average particle size of the bromine-based flame retardant eluted out, where presence of defects, e.g., void, is confirmed before the etching.

More concretely, the electron micrograms taken before and after the etching are analyzed by an image analysis/measurement software (Planetron, image-Pro-Plus) to determine the dispersed particle diameter and its distribution.

The bromine-based flame retardant for the present invention contains, as the major ingredient, polybrominated styrene obtained by polymerization of brominated styrene, and is dispersed very uniformly in the aromatic polyamide while forming the fine particles. The polyamide composition of the present invention, finely dispersed with the bromine-based flame retardant, shows high flame retardancy and, at the same time, good moldability. It is therefore suitable as the flame-retardant resin for forming a member for electric and electronic devices, in particular connectors, which become fine and are structured to accommodate fine terminals.

Average particle size of the brominated flame retardant in a member for the electric and electronic devices, in particular connectors, made of the flame-retardant polyamide composition of the present invention can be determined in a manner similar to that for the brominated flame retardant in the pellet. The brominated flame retardant in the electric and electronic devices, in particular connectors, made of the flame-retardant polyamide composition of the present invention has an average particle size equivalent to that of the brominated flame retardant in the pellet, i.e., less than 0.9 $\mu$m, preferably 0.01 to 0.8 $\mu$m. The retardant particles are finely dispersed also in the formed article, without agglomerating with each other. In other words, the brominated flame retardant particles for the present invention are dispersed in the same condition in the formed article as in the unformed flame-retardant polyamide composition, without agglomerating with each other the forming step, e.g., injection molding or extrusion.

The flame-retardant polyamide composition of the present invention can be produced by mixing the above-described components by a Henschel mixer, V blender, ribbon blender or tumbler blender, or granulating or crushing the mixed components after they are molten and kneaded by a mono-axial or multi-axial extruder, kneader or Banbury mixer.

The electric or electronic device member of the present invention can be produced by forming the flame-retardant polyamide composition of the present invention obtained by the above procedure into a desired shape and cooling the shape, after melting the composition under heating. The forming step is effected by, e.g., melting the flame-retardant polyamide composition of the present invention under heating in a mold capable of giving the desired shape.

The flame-retardant polyamide composition of the present invention shows good flowability, when molten, as revealed by the thin-wall flow length test, and is suitable for efficient production of an electronic device member, e.g., connector, having a number of thin-wall portions.

Moreover, the electronic device member, e.g., connector, made of the flame-retardant polyamide composition of the present invention is highly tough and resistant to cracking when the male connector is inserted into the female connector to join them to each other. The electric or electronic device member is highly resistant to heat, and thermally deformed to a lesser extent during the reflow soldering step.

EFFECT OF THE INVENTION

The flame-retardant polyamide composition of the present invention, being dispersed with the bromine-based flame retardant having a number-average particle size of less than 0.9 μm, shows excellent flowability, when molten under heating. The electric or electronic device member as the formed article of the flame-retardant polyamide composition of the present invention, in particular connector, has excellent toughness and resistance to heat.

More concretely, the flame-retardant polyamide composition has fracture energy of 37 mJ or more and thin-wail flowability of 60 mm or more A flame retardant having a number-average particle size of more than 0.9 μm will deteriorate resistance to heat and, in particular toughness, of the electric or electronic device member, e.g., connector, of the flame-retardant polyamide composition in which the flame retardant is dispersed. Such a flame retardant will suffer re-agglomeration and growth of the particles, when heated around 200° C. or higher in a reflow furnace or molten, causing deterioration of the outer appearances and toughness of the formed article. These phenomena can be confirmed by observing size of the flame retardant particles in a sheet obtained by pressing the flame-retardant polyamide composition pellets.

EXAMPLES

The present invention is described more concretely by EXAMPLES, which by no means limit the present invention.

The following components were prepared for EXAMPLES and COMPARATIVE EXAMPLES.

A) Heat-Resistant Polyamide (1)
Composition:
Acid component: 55% by mol of terephthalic acid and 45% by mol of adipic acid
Diamine component: 100% by mol of 1,6-diaminohexane
Intrinsic viscosity [η]: 1.0 dl/g
Melting point: 310° C.
MFR: 9 g/10 minutes, measured at 320° C.
Heat-resistant polyamide (2)
Composition:
Acid component 55% by mol of terephthalic acid and 45% by mol of adipic acid
Diamine component: 100% by mol of 1,6-diaminohexane
Intrinsic viscosity [η]: 0.8 dl/g
Melting point: 310° C.
MFR: 150 g/10 minutes, measured at 320° C.
(B) Inorganic Reinforcing Agent
Glass fibers (Asahi Fiber Glass, CS03JAFT2A)
(C) Bromine-Based Flame Retardant (1)
Polybrominated styrene
GLC's PDBS80, MFR: 115 g/10 minutes
Bromine-based flame retardant (2)
Brominated polystyrene
GLC's PBS64.HW, MFR: 58 g/10 minutes
Bromine-based flame retardant (3)
Polybrominated styrene
Ferro's PC-68PBC, MFR: 21 g/10 minutes (D) Antimony-Containing Compound and/or Zinc-Containing Compound Oxide
Sodium anatimonate
Nissan Chemical's Sun Epoch NA-1070, 5 parts by weight The other components were also used, in addition to the above: 1 part by weight of SEBS made maleic (Asahi Kasei's Tuftec M1913) as a drip inhibitor during combustion, 0.3 parts by weight of hydrotalcite (Kyowa Chemical Industry's DHT-4C) as a halogen catcher, 0.3 parts by weight of wax (Clariant Japan's Hostamont NaV101) as a releasing agent, and 0.7 parts by weight of talc (Matsumura Sangyo's Hifiller #100, whiteness: 95) as a nucleating agent for crystallization.

EXAMPLES 1 and 2

The above-described components were mixed to have the compositions given in Table 1, and each composition was charged in a biaxial, vent-equipped extruder et at 310° C. where it was molten and kneaded into the pellets
Melting Point
Melting point (Tm) was defined as the temperature at which the maximum peak was observed in the DSO endothermic curve drawn for each polyamide composition, wherein the sample put in an aluminum pan was heated at 10° C./minute the establish the curve.
MFR
MFR was determined in accordance with ASTM D-1238, outlined below:
MFR was measured for the pelletized heat-resistant polyamide, dried at 120° C. under a vacuum for 12 hours by a vacuum drier, using an automatic extrusion type plastometer with an orifice having an internal diameter of 2.095 mm at a load of 2,160 g and at a temperature of 320° C.
Viscosity
Viscosity was determined in accordance with ISO 307-1984(E), wherein the polyamide was extracted with concentrated sulfuric acid (96%) from the polyamide composition to prepare the solution of the concentrated sulfuric acid containing polyamide at 0.005 g/ml. Viscosity of the polyamide means that of the above solution determined at 25° C. by an Ubbelode type viscometer specified by ISO 3105.
Flame Retardancy
Flame retardancy was determined for the combustion test piece (1/32 by ½ by 5 inches) by the vertical combustion test, in accordance with the UL-94 specification.
Bending Test (Toughness)
A test piece (64 by 6 by 0.8 mm) prepared by injection molding was bending-tested under the conditions of span: 26 mm and bending speed: 6 mm/minute, to measure bending strength, bending modulus of elasticity, energy required to fracture the test piece (toughness) and strain when the test piece was fractured.
Molder: Sodick Plustech's Tuparl TR40S3A
Cylinder temperature:
NT/C1/C2/C3: 320° C./320° C./310° C./300° C.
Mold temperature: 120° C.
Bending tester: NTESCO's AB5
Thin-wall flow length test
The sample was injected into a 10 mm wide, 0.5 mm thick bar-flow mold under the following condtions:
The first 20 shots were discarded, and next 10 shots were measured for flow length (mm), to determine the average.
Injection molder: Toshiba Machine's IS-55EPN
Injection pressure: 100 kg/cm²,
Injection speed: 99%
Cylinder temperature:
NT/C1/C2/C3: 320° C. 320° C./310° C./300° C.
Mold temperature; 120° C.

Reflow Heat-Resistance Test

A 64 mm long, 6 mm wide and 0.8 mm thick test piece prepared by injection molding was humidified at 400° C. and RH 95% for 96 hours. It was reflow-treated following the temperature profile shown in FIG. 1 using a reflow-soldering machine which can heat the work by infrared ray and hot air (Nihon Antom Industrial's, SOLSIS-201IR).

The test piece was set on a 1 mm thick glass epoxy substrate, provided with a temperature sensor on the surface, to measure the temperature profile. Referring to FIG. 1, the test piece was heated to set temperature levels ("a": 240° C., "b": 230° C., "c": 220° C. and "d": 210° C.), at which it was held for 20 seconds, to find the highest set temperature at which the test piece was not molten and no voids were observed on its surface. This temperature level was defined as the reflow heat resistance temperature.

The above-described set temperature means the temperature level at which the test piece could be held for 20 seconds or more while the reflow solder was sufficiently molten. The test piece is generally heated to a temperature level around 10° C. higher than the set temperature level shown in FIG. 1 in the step of reflow, although varying depending on a reflow soldering machine used.

Size of Flame Retardant Particles

Each of the pellets of the flame-retardant polyamide composition was covered with an epoxy resin, and ground to form the plane in which the glass fibers were arranged along the plane. The ground pellet was etched, at room temperature, with methylene chloride in which it was immersed for 2 hours, to elute the bromine-based flame retardant out of the plane. Then, a Pt—Pd film was deposited over the plane by an ion sputterer (Hitachi Ltd., E-1030), and the plane left by the bromine-based flame retardant was observed by a scanning electron microscope (Hitachi Ltd., S-800, magnification: 500 and 3,000). The presence of defects, e.g., void, was confirmed before the etching.

The electron micrograms taken were analyzed by an image analysis/measurement software (Planetron, image-Pro-Plus), to determine size and particle size distribution.

The results are given in Table 1.

COMPARATIVE EXAMPLES 1 AND 2

The tests were conducted in the same manner as in EXAMPLE 1 for te compositions given in Table 1.

The results are give in Table 1.

TABLE 1

|  | Example 1 | Example 2 | Compar. Example 1 | Compar. Example 2 |
|---|---|---|---|---|
| (A) Component |  |  |  |  |
| Heat-resistant polyamide (1) (% by weight) | — | — | 40 | 42 |
| Heat-resistant polyamide (2) (% by weight) | 40 | 40 | — | — |
| (B) Component |  |  |  |  |
| Inorganic reinforcing agent | 30 | 30 | 30 | 30 |
| (C) Component |  |  |  |  |
| Bromine-based flame retardant (1) (% by weight) | 25 | — | 25 | — |
| Bromine-based flame retardant (2) (% by weight) | — | 25 | — | — |
| Bromine-based flame retardant (3) (% by weight) | — | — | — | 23 |
| $NaSbO_3$ (% by weight) | 5 | 5 | 5 | 5 |
| Characteristics of the composition |  |  |  |  |
| (A) MFR of component (g/10 minutes) | 150 | 150 | 9 | 9 |
| Number-average particle size of the flame retardant dispersed in the pellet (μm) | 0.7 | 0.7 | 0.9 | 0.7 |
| Viscosity (ml/g) | 95 | 99 | 127 | 121 |
| Flame retardancy test result | V-O | V-O | V-O | V-O |
| Bending strength (MPa) | 234 | 243 | 210 | 239 |
| Bending modulus of elasticity ($\times 10^4$ MPa) | 1.21 | 1.24 | 1.29 | 1.24 |
| Fracture energy (mJ) | 42 | 43 | 32 | 46 |
| Strain (mm) | 3.2 | 3.3 | 2.7 | 3.4 |
| Thin-wall flow length (mm) | 70 | 65 | 55 | 40 |
| Reflow heat resistance temperature (° C.) | 230 | 230 | 225 | 230 |

What is claimed is:

1. A flame-retardant polyamide composition comprising:
(A) 20 to 80% by weight of an aromatic polyamide, composed of recurring units of dicarboxylic acid component unit and diamine component unit, the former composed of 30 to 100% by mol of a terephthalic acid component unit and 0 to 70% by mol of an aromatic dicarboxylic acid component unit other than terephthalic acid and/or 0 to 70% by mol of a $C_4$ to $C_{20}$ aliphatic dicarboxylic acid component unit and the latter composed of an aliphatic diamine component unit and/or an alicyclic diamine component unit; and having an MFR of 40 to 300 g/10 minutes, determined at a load of 2,160 g and at a temperature of 10° C. plus melting point, and melting point exceeding 290° C.;
(B) 5 to 50% by weight of an inorganic reinforcing agent,
(C) 5 to 40% by weight of a polybrominated styrene obtained by polymerization of brominated styrene, wherein said polybrominated styrene has an MFR of 40 to 400 g/10 minutes, determined at a load of 1,2000 g and at a temperature of 270° C. using an orifice having a diameter of 2.095 mm, and/or said polybrominated styrene has a weight-average molecular weight of 2,000 to 500,000, and
(D) 0.1 to 10% by weight of an antimony-containing compound and/or zinc-containing compound oxide, the components (A) to (D) totaling 100% by weight, wherein, said polyamide composition has flame retardancy equivalent to V-0 determined in accordance with the UL-94 specification, and said has a number-average particle size of less than 0.90 μm in said polyamide composition, when it is pelletized.

2. The flame-retardant polyamide composition according to claim 1, wherein the polyamide extracted with concentrated sulfuric acid from said flame-retardant polyamide composition as a viscosity of 60 to 110 ml/g.

3. The flame-retardant polyamide composition according to claim 1, wherein said polybrominated styrene contained in the formed article of said flame-retardant polyamide composition has number-average particle size of less than 0.90 μm.

4. A flame-retardant pelletized polyamide resin composition comprising:

(A) 20 to 80% by weight of an aromatic polyamide, composed of recurring units of dicarboxylic acid component unit and diamine component unit, the former composed of 30 to 100% by mol of a terephthalic acid component unit and 0 to 70% by mol of an aromatic dicarboxylic acid component unit other than terephthalic acid and/or 0 to 70% by mol of a $C_4$–$C_{20}$ aliphatic dicarboxylic acid component unit and the latter composed of an aliphatic diamine component unit and/or an alicyclic diamine component unit; and having an MFR of 40 to 300 g/10 minutes, determined at a load of 2,160 g and at a temperature of 10° C. plus melting point, and melting point exceeding 290° C.;

(B) 5 to 50% by weight of an inorganic reinforcing agent, (C) 5 to 40% by weight of a polybrominated styrene obtained by polymerization of brominated styrene, wherein said polybrominated styrene has an MFR of 40 to 400 g/10 minutes, determined a an load of 1,200 g and at a temperature of 270° C. using an orifice having a diameter of 2.095 mm, and/or said polybrominated styrene has a weight-average molecular weight of 2,000 to 500,000, and (D) 0.1 to 10% by weight of an antimony-containing compound and/or zinc-containing compound oxide, the components (A) to (D) totaling 100% by weight, wherein, the polyamide extracted with concentrated sulfuric acid from said pelletized polyamide resin composition has a viscosity of 60 to 110 ml/g.

5. A formed article of flame-retardant polyamide comprising:

(A) 20 to 80% by weight of an aromatic polyamide, composed of recurring units of dicarboxylic acid component unit and diamine component unit, the former composed of 30 to 100% by mol of a terephthalic acid component unit and 0 to 70% by mol of an aromatic dicarboxylic acid component unit other than terephthalic acid and/or 0 to 70% by mol of a $C_4$–$C_{20}$ aliphatic dicarboxylic acid component unit and the latter composed of an aliphatic diamine component unit and/or an alicyclic diamine component unit, (B) 5 to 50% by weight of an inorganic reinforcing agent, (C) 5 to 40% by weight of a polybrominated styrene obtained by polymerization of brominated styrene, wherein said polybrominated styrene has an MFR of 40 to 400 g/10 minutes, determined at a load of 1,200 g and at a temperature of 270° C. using an orifice having a diameter of 2.095 mm, and/or said polybrominated styrene has a weight-average molecular weight of 2,000 to 500,000, and (D) 0.1 to 10% by weight of an antimony-containing compound and/or zinc containing compound oxide, the components (A) to (D) totaling 100% by weight, wherein, said polybrominated styrene contained in said formed article has a number-average particle size of less than 0.90 μm.

6. The formed article of flame-retardant polyamide according to claim 5, wherein said polyamide extracted with concentrated sulfuric acid from said formed article has a viscosity of 60 to 110 ml/g.

7. The formed article of flame-retardant polyamide according to claim 5, having flame retardancy equivalent to V-0, determined in accordance with the UL-94 specification.

8. A flame-retardant electric or electronic device member, made of the flame-retardant polyamide composition according to one of claims 1 to 3, or the flame-retardant pelletized polyamide resin composition according to claim 4.

9. The flame-retardant electric or electronic device member according to claim 8, wherein said member is a connector.

* * * * *